Jan. 28, 1969  R. W. HOLLAND  3,424,480

CLOSURE CONNECTION MEANS FOR A HEAT EXCHANGER

Filed March 30, 1966  Sheet 1 of 2

INVENTOR.
RICHARD W. HOLLAND
BY
Woodling, Krost, Granger and Rust
attys

INVENTOR.
RICHARD W. HOLLAND
BY
Woodling, Krost, Granger and Rust
attys.

United States Patent Office 3,424,480
Patented Jan. 28, 1969

3,424,480
CLOSURE CONNECTION MEANS FOR A
HEAT EXCHANGER
Richard W. Holland, 6950 Jay Drive,
Elyria, Ohio 44035
Filed Mar. 30, 1966, Ser. No. 538,750
U.S. Cl. 285—111        5 Claims
Int. Cl. F16l 17/06, 35/00, 19/02

ABSTRACT OF THE DISCLOSURE

A heat exchanger closure connection to close the end of an outer tube and connect the end of an inner tube to an external fluid tube. This comprises flanges on the connecting ends of all three tubes and fastened in an integral manner such as by welding. The flange on the inner tube has a split ring in a groove on the outer surface thereof which secures a sealing ring between one side thereof and an internal flare sealing surface on the inner surface of the flange of the outer tube. The other side of the split ring engages the front face of the flange of the external tube and a second sealing member fits between the front faces of the flanges of the inner tube and external tube. The assembly is held together by bolts extending between and connected to the flanges of the outer tube and the external tube.

Summary of the invention

The present invention by way of the structure disclosed and claimed provides a simple self aligning single joint which provides positive protection against interstream leakage in a heat exchanger.

My invention realtes to closure connection means for a heat exchanger having at least first and second fluid passage enclosures.

An object of my invention is the provision of removable closure connection means for a heat exchanger whereby fluid in the first and second fluid pasage enclosures is sealed against leakage to atmosphere and is sealed against inter-leakage between said enclosures.

Another object of my invention is the provision of removable closure connection means having at least first and second fluid seal means whereby the first seal means seals fluid against leakage to atmosphere from said first fluid passage enclosure and the second seal means seals fluid against leakage to atmosphere from said second passage enclosure, and whereby both the seal means seals fluid against inter-leakage between the first and second fluid passage enclosures.

Another object is the provision of removable closure connection means having axial thrust constraining means whereby the inner and outer tubing or piping which define the first and second fluid passage enclosures is constrained against relative axial movement with respect to each other.

Another object is the provision of removable closure connection means for a heat exchanger, whereby the axial thrust constraining means and the fluid seal means include the combination of contractible annular wedge seal means abutting against annular ring constraining means disposed in an anular constraining groove.

Another object is the provision of removable closure connection means, whereby the axial relatively movable parts upon being assembled are self-matching, thereby avoiding the requirements of matching tolerances between the various parts.

Another object resides in the fact that the axial thrust constraining means and the fluid seal means automatically render the axial relatively movable parts free from tolerance matching.

Another object is the provision of pressure-responsive seal means which automatically renders the axial relatively movable parts free from tolerance matching.

Other objects and a fuller understanding of the invention may be had by referring to the following description and claims, taken in conjunction with the accompanying drawings, in which:

Figure 9:
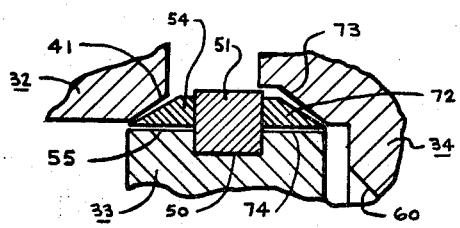
Figure 10:
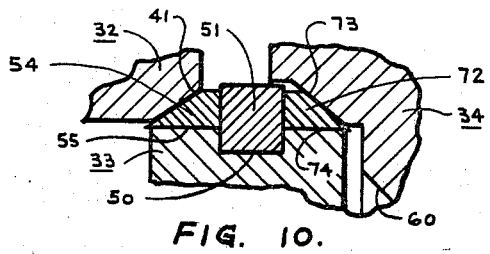

FIGURE 9 is a fragmentary cross-sectional view showing the fluid seal means as comprising opposing annular contractible wedge means disposed on opposite sides of the axial thrust constraining ring means, the parts being in the loosely assembled position before the draw bolts are tightened; and FIGURE 10 is a view corresponding to FIGURE 9 but showing the parts in the finally assembled position after the draw bolts have been tightened.

Figure 1:
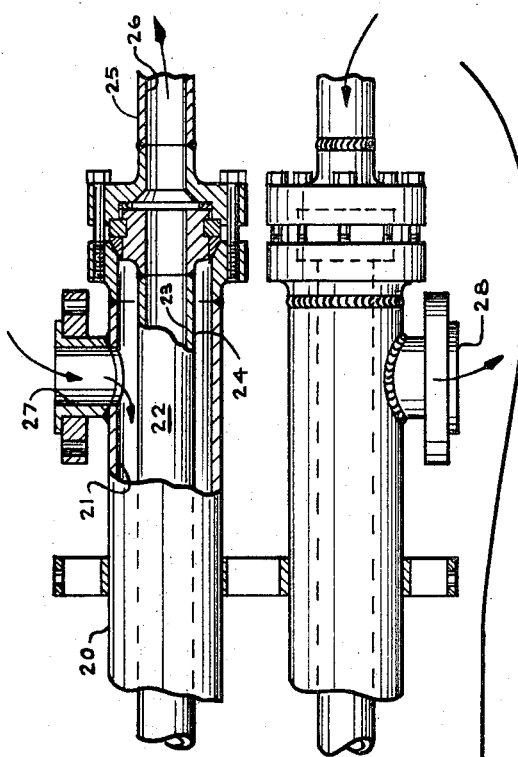
FIGURE 1 is a side view of a heat exchanger embodying my removable closure connection means, parts being broken away and other parts being shown in section to illustrate the invention.
Figure 2:
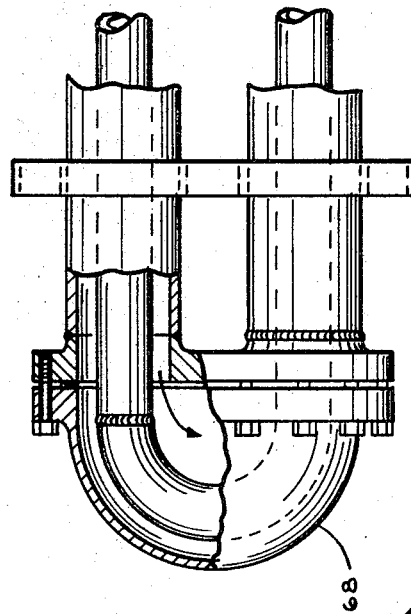
FIGURE 2 is an enlarged, cross-sectional fragmentary view of my invention showing principally the combination of the seal means and the axial thrust constraining means.
Figure 4:
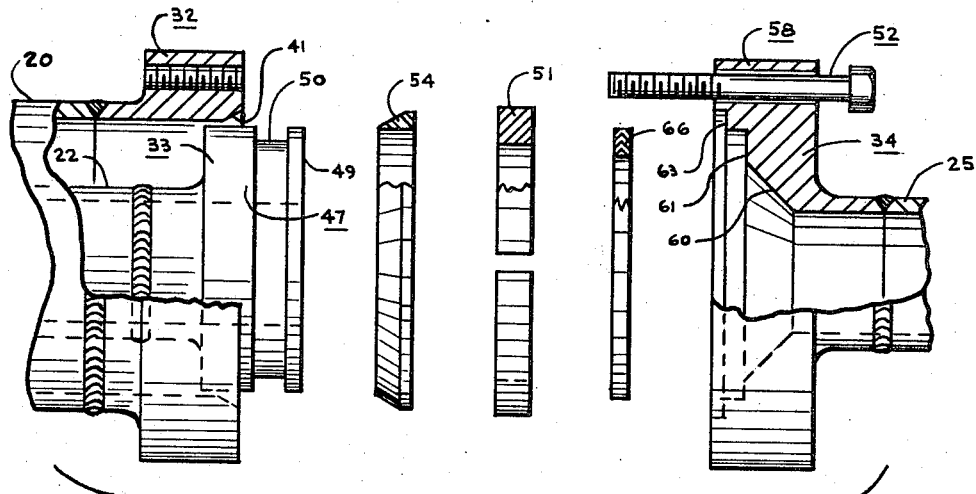
FIGURE 4 is an exploded view of my removable closure connection means.
Figures 7, 8:
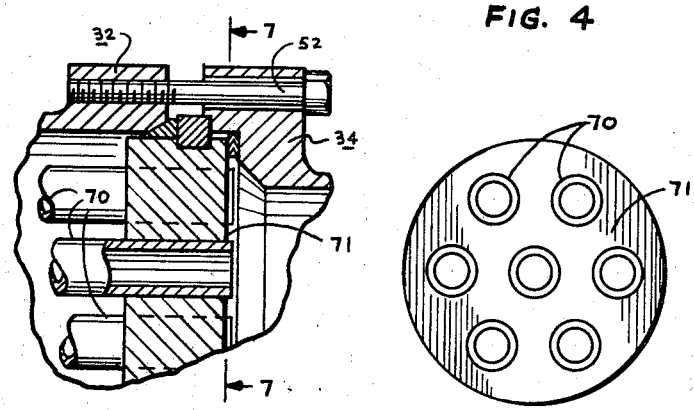
FIGURE 7 is an end view taken along the line 7—7 of FIGURE 8 and shows principally a heat exchanger having a plurality of inner tubes.
FIGURE 8 is a fragmentary side view, partly in cross-section, showing my invention as applied to a heat exchanger having a plurality of inner tubes.

My invention may be applied to a heat exchanger having a single inner tube as shown in FIGURES 1 and 2, or to a heat exchanger having a plurality of inner tubes as shown in FIGURES 7 and 8.

With reference to FIGURES 1 and 2, the heat exchanger comprises an outer tube 20 with an inside fluid containing wall 21, an inner tube 22 with inside and outside fluid containing walls 23 and 24, and an end extension tube 25 with an inside fluid containing wall 26. The inside wall 21 of the outer tube 20 and the outside wall 24 of the inner tube 22 define a first fluid passage enclosure. The inside wall 23 of the inner tube 22 and the inside wall 26 of the end extension tube 25 define a second fluid passage enclosure. The inner tube 22 is bent back upon itself like a hairpin and in the trade this type of heat exchanger is usually referred to as a hairpin heat exchanger. Fluid may enter the first fluid passage enclosure through an inlet 27 and may leave through an outlet 28.

My removable enclosure connection means comprises first flange means 32 disposed for connection, such as by an annular weld 35, to the outer tube 20, second flange means 33 disposed for weldable connection to the inner tube 22, and third flange means 34 disposed for weldable connection to the end extension tube 25.

The first flange means 32 comprises a first hollow portion 38 and a first surrounding flange portion 39. The first hollow portion 38 defines a first hollow substantially cylindrical wall 40 disposed for substantially axial alignment with the inside wall 21 of the outer tube 20. The first hollow portion 38 terminates in a first continuous annular sealing internal flare surface 41. The first surrounding flange portion 39 has a first confronting face wall 42 extending in a direction outwardly of the annular sealing internal flare surface 41 and constitutes a first flange face wall.

Figure 3:
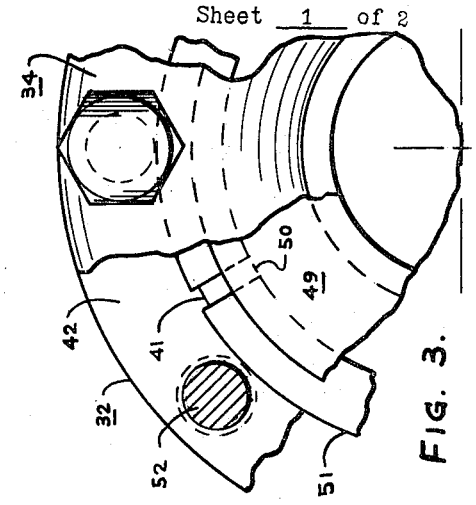
FIGURE 3 is a fragmentary end view of FIGURE 2.

The second flange means 33 comprises a second hollow portion 44 and a second surrounding flange portion 45. The second hollow portion 44 defines a second hollow substantially cylindrical wall 46 disposed for substantially axial alignment with the inside wall 23 of the inner tube 22. The second surrounding flange portion 45 comprises a second substantially cylindrical body 47 having an external diameter 48 less than the internal diameter of the first hollow substantially cylindrical wall 40. The second hollow portion 44 and the second substantially cylindrical body 7 terminate in a second flange face wall 49 extending in a direction outwardly of the second hollow substantially cylindrical wall 46. The second substantially cylindrical body 47 has an annular groove 50 into which is removably mounted split ring means 51 (see FIG. 3). The split ring means 51 may comprise two or more sections. The split ring means 51 and the groove 50 constitute axial thrust constraining means whereby the axial relatively movable parts are constrained against relative axial movement when the two flange means 32 and 34 are being drawn tightly together by the draw bolts 52. The split ring means 51 has first and second opposed sides extending outwardly from the external diameter of the substantially cylindrical body 47. The first and second opposed sides may be identified respectively as the left- and right-hand sides of the split ring means 51. As shown in FIGURE 2, the second substantially cylindrical body 47 has a first annular body sealing surface, identified by the reference character 55, extending in an axial direction away from the first opposed side of the split ring means 51 and is disposed to fit within the first hollow substantially cylindrical wall 40. The annular internal flare surface 41 defines with the second annular body sealing surface 55 a continuous annular converging sealing recess. Mounted in this converging sealing recess is first seal means comprising a continuous annular sealing ring 54 having a wedging surface abuttable against the internal flare sealing surface 41 and having a hollow substantially cylindrical internal surface surrounding and contractible against the annular body sealing surface 55 of the second subtsantially cylindrical body 47. The first side of the split ring means 51 is abuttable against the annular sealing ring 54 and forces the same into the converging sealing recess when the draw bolts 52 are tightened. The annular sealing ring 54, when it is forced into the converging sealing recess, provides two fluid seals. The first fluid seal is between the wedging surface and the internal flare surface 41 and the second seal is between the hollow substantially cylindrical internal surface of the annular sealing ring 54 and the annular body sealing surface 55 of the second substantially cylindrical body 47.

Figure 5:
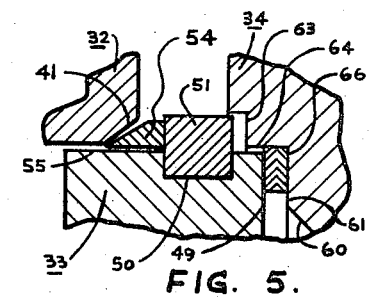
FIGURE 5 is a fragmentary cross-sectional view showing the parts in the loosely assembled position before the draw bolts are tightened.
Figure 6:
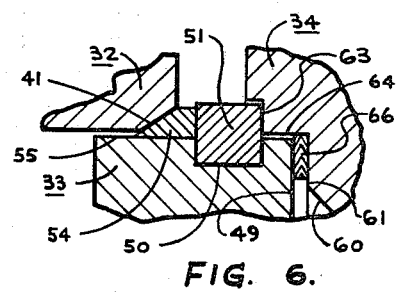
FIGURE 6 is a view corresponding to FIGURE 5 but showing the parts in the finally assembled position after the draw bolts have been tightened.

The third flange means 34 comprises a third hollow portion 57 and a third surrounding flange portion 58. The third hollow portion 57 defines a third hollow substantially cylindrical wall 59 disposed for substantially axial alignment with the inside wall 26 of the end extension tube 25. The third hollow portion 57 and the third surrounding flange portion 58 terminate in a third confronting face wall means extending in a direction outwardly of the third hollow substantially cylindrical wall 59. The third confronting face wall means includes an internal tapering wall 60, a sealing counterbore face wall 61, a first internal axial extending wall 62, a radially extending abutment face wall 63, a second internal axially extending wall 64, and a third flange face wall 65 confronting the first flange face wall 42 and spaced therefrom. The second internal axially extending wall 64 overlays the split ring 51 and holds same into the groove 50. A second sealing means comprising a pressure-responsive seal ring 66 is disposed between the second flange face wall 49 and the sealing counterbore face wall 61. The second sealing means is preferably of the chevron type and is compressible in an axial direction when the draw bolts 52 are being tightened. FIGURE 5 shows the position of the parts when the draw bolts 52 are loose and FIGURE 6 shows the position of the parts when the draw bolts 52 have been drawn tight. In the tightly assembled position, shown in FIGURE 6, the pressure-responsive sealing ring 66 is compressed between the sealing counterbore face wall 61 and the second flange face wall 49. Being pressure-responsive, the higher the fluid pressure, the greater the seal. As the fluid pressure increases, the chevron elements tend to spread, thereby increasing the sealing action. As shown in FIGURE 6, the abutment face wall 63 is pressed or forced tightly against the second side of the split ring means 51. This same force is transmitted through the split ring means 51 to the first annular sealing ring 54 and forces the latter into the annular converging sealing recess. As shown in FIGURE 5, the angle which the wedging surface of the sealing ring 54 makes with the longitudinal axis of the tubing is less than the angle which the internal flare surface 41 makes with the longitudinal axis. Thus the wedging tip is forced radially against the annular body sealing surface 55 for making an effective high pressure seal.

In the tightly assembled position, the split ring means 51 and the groove 50 in which it is mounted constitute axial thrust constraining means for constraining the second flange means 33 against relative axial movement with respect to the first and third flange means 32 and 34.

Thus, my closure connection means makes a good sound mechanical connection, as well as a good sound fluid seal connection. Also my closure connection means is disposed to be readily demountable whereby the hairpin inner tube 22 may be withdrawn longitudinally from the outer tube 20 by removing an end cap 68 provided on the left-hand end of the assembly in FIGURE 1. In dismounting my closure connection means, the draw bolts 52 are first removed which permits the third flange means 34 to be disengaged, after which the split ring means 51 and the first and second seal means may be removed, thereby clearing the second flange means 33, whereby the hairpin inner tube 22 may be longitudinally withdrawn from the outer tube 20.

FIGURES 7 and 8 show a heat exchanger having a plurality of inner tubes 70 connected to a flange, identified by the reference character 71, being comparable to the second flange means 33. Otherwise, the construction in FIGURES 7 and 8 is substantially the same as that shown in the previous figures.

In FIGURES 9 and 10, a second wedge sealing ring 72 replaces the pressure-responsive sealing ring 66. The second wedge sealing ring 72 is substantially identical to the first wedge sealing ring 54 and fits into an annular recess formed by an internal flare surface 73 provided in the third flange means 34 and a second annular body sealing surface 74 which extends as in an axial direction away from the second side of the split ring means 51 on the substantially cylindrical body 47 of the second flange means 33. Except for the substitution of the second wedge sealing ring 72 for the pressure-responsive sealing ring 66, the structure in FIGURES 9 and 10 is substantially the same as that shown in the previous views. The second wedge sealing ring 72 abuts against the right-hand side of the split ring means 51. The tightening of the draw bolts 52 forces the first and second wedge sealing means 54 and 72 into their respective annular converging recesses. In FIGURES 9 and 10, the split ring means 51 and the two opposing wedge sealing means 54 and 72 function as axial thrust constraining means to constrain the second flange means 33 against relative axial movement with respect to the first and third flange means 32 and 34.

Thus, with my closure connection means the fluid in the first and second fluid passage enclosures is sealed against leakage to atmosphere and is sealed against inter-leakage between the two enclosures. Also with my invention, the requirement of matching close tolerances between the relatively movable axial parts is eliminated, because the parts become self-matching with respect to each other as they are axially drawn together.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. Closure connection means for a heat exchanger, said heat exchanger having an outer tube with an inside fluid containing wall, at least an inner tube with inside and outside fluid containing walls, and an end extension tube with an inside fluid containing wall, said inside wall of said outer tube and said outside wall of said at least an inner tube defining a first fluid passage enclosure, said inside wall of said at least an inner tube and said inside wall of said end extension tube defining a second fluid passage enclosure, said closure connection means comprising first flange means disposed for integral connection to said outer tube, second flange means disposed for integral connection to said at least an inner tube, and third flange means disposed for integral connection to said end extension tube, said first flange means comprising a first hollow portion and a first surrounding flange portion, said first hollow portion defining a first hollow substantially cylindrical wall disposed for substantially axial alignment with said inside wall of said outer tube, said first hollow portion terminating in a first continuous annular internal flare sealing surface, said first surrounding flange portion having first confronting wall means extending in a direction radially outwardly of said first continuous annular internal flare sealing surface and constituting a terminating first flange face wall, said second flange means comprising a second hollow portion and a second surrounding flange portion, said second hollow portion defining a second hollow substantially cylindrical wall disposed for substantially axial alignment with said inside wall of said at least an inner tube, said second surrounding flange portion comprising a second substantially cylindrical body having an external diameter less than the internal diameter of said first hollow substantially cylindrical wall, said second hollow portion and said second substantially cylindrical body terminating in a second flange face wall extending in a direction radially outwardly of said second hollow substantially cylindrical wall, said second substantially cylindrical body having annularly disposed thrust abutment means provided thereon and means securing said thrust abutment means against axial movement with reference thereto, said thrust abutment means having first and second opposed sides extending radially outwardly from the external diameter of said substantially cylindrical body, said second substantially cylindrical body having a first annular body sealing surface extending in an axial direction away from said first opposed side of said thrust abutment means and fitting within said first hollow substantially cylindrical wall, said first annular body sealing surface defining with said first annular internal flare sealing surface a first continuous annular converging sealing recess, first continuous annular sealing means in said first converging sealing recess and having outer and inner surface means engaging respectively said first annular internal flare sealing surface and said first annular body sealing surface, said first side of said thrust abutment means abutting and confining said first sealing means in said first converging sealing recess and thereby providing a first seal between said outer surface means of said first sealing means and said first annular internal flare sealing surface and a second seal between said inner surface means of said first sealing means and said annular body sealing surface of said second substantially cylindrical body, said third flange means comprising a third hollow portion and a third surrounding flange portion, said third hollow portion defining a third hollow substantially cylindrical wall disposed for substantially axial alignment with said inside wall of said end extension tube, said third hollow portion and said third surrounding portion having third confronting face wall means extending in a direction radially outwardly of said third hollow substantially cylindrical wall, said third confronting face wall means including a thrust portion for transmitting a force to said second opposed side of said thrust abutment means and a third flange face wall confronting said first flange face wall and spaced therefrom, second continuous annular sealing means having inner and outer surfaces engaging respectively said second substantially cylindrical body and said third confronting face wall means and thereby providing a third seal between said inner surface of said second sealing means and said second substantially cylindrical body and a fourth seal between said outer surface of said second sealing means and said third confronting face wall means, said first and second seals preventing fluid leakage from said first fluid passage enclosure and said third and fourth seals preventing fluid leakage from said second fluid passage enclosure and said second and third seals preventing fluid inter-leakage between said first and second fluid passage enclosures, and force connection means interconnecting said first and third flange portions to secure and draw same together, said force connection means and said first and third flange means transmitting opposing forces respectively to said first and second opposed sides of said thrust abutment means to secure said second flange means against axial movement with reference to said first and third flange means.

2. The structure of claim 1, wherein said first continuous annular sealing means comprising a continuous annular ring having a wedging edge fitting into said first converging sealing recess.

3. The structure of claim 1, wherein said second continuous annular sealing means comprises continuous annular pressure-responsive ring means.

4. The structure of claim 1, wherein said third confronting face wall means includes a second continuous annular internal flare surface and wherein said second substantially cylindrical body has a second annular body sealing surface extending in an axial direction away from said second opposed side of said thrust abutment means, said second continuous annular internal flare surface defining with said second annular body sealing surface a second continuous annular converging sealing recess, said second continuous annular sealing means comprising a continuous annular ring having a wedging edge fitting into said second converging sealing recess, said second side of said thrust abutment means confining and abutting said second sealing means in said second converging sealing recess, said opposing forces being transmitted respectively to said first and second sides of said thrust abutment means through said first and second sealing means.

5. The structure of claim 1 wherein said thrust abutment means comprises an annular groove on and around the outer surface of said second substantially cylindrical body and a split ring residing within said annular groove with ends of the split ring terminating short of each other and the opposed sides of said thrust abutment means comprising opposed sides of said split ring.

References Cited

UNITED STATES PATENTS

| | | | |
|---|---|---|---|
| 255,523 | 3/1882 | Lightburne | 285—110 X |
| 980,939 | 1/1911 | Glauber | 285—342 X |
| 1,559,949 | 11/1925 | Feldmeier | 285—137 X |
| 2,520,755 | 8/1950 | Brown | 285—137 X |
| 3,079,992 | 3/1963 | Otten et al. | 285—131 X |
| 3,109,671 | 11/1963 | Braun | 285—133 |
| 3,155,404 | 11/1964 | Brown et al. | 285—137 |
| 3,377,087 | 4/1968 | Samerdyke et al. | |

FOREIGN PATENTS

| | | |
|---|---|---|
| 1,348,409 | 12/1963 | France. |
| 100,308 | 11/1940 | Sweden. |

CARL W. TOMLIN, *Primary Examiner.*

DAVE W. AROLA, *Assistant Examiner.*

U.S. Cl. X.R.

285—131, 332.3, 334.2, 341, 348, 363